US008609007B2

(12) United States Patent
Marchini et al.

(10) Patent No.: US 8,609,007 B2
(45) Date of Patent: Dec. 17, 2013

(54) METHOD AND APPARATUS FOR MANUFACTURING PNEUMATIC TYRES

(75) Inventors: Maurizio Marchini, Milan (IT); Marco Cantu, Milan (IT); Pierangelo Misani, Milan (IT)

(73) Assignee: Pirelli Tyre S.p.A., Milan (IT)

( * ) Notice: Subject to any disclaimer, the term of this patent is extended or adjusted under 35 U.S.C. 154(b) by 1015 days.

(21) Appl. No.: 12/084,298

(22) PCT Filed: Dec. 19, 2005

(86) PCT No.: PCT/IT2005/000743
§ 371 (c)(1),
(2), (4) Date: Oct. 16, 2009

(87) PCT Pub. No.: WO2007/072511
PCT Pub. Date: Jun. 28, 2007

(65) Prior Publication Data
US 2010/0032873 A1   Feb. 11, 2010

(51) Int. Cl.
*B29C 35/02* (2006.01)
(52) U.S. Cl.
USPC ............. 264/313; 264/314; 264/326; 425/43; 425/51; 425/54
(58) Field of Classification Search
USPC ........... 264/313, 326, 314; 425/43, 49, 51, 54
See application file for complete search history.

(56) References Cited

U.S. PATENT DOCUMENTS

| | | | | |
|---|---|---|---|---|
| 1,366,750 A | * | 1/1921 | Smith et al. | 425/51 |
| 1,371,775 A | * | 3/1921 | Cox | 425/51 |
| 1,373,389 A | * | 3/1921 | Witsaman | 425/43 |
| 1,405,470 A | | 2/1922 | Wheatley | |
| 1,466,366 A | | 8/1923 | Lehmann | |
| 1,470,657 A | | 10/1923 | Traum | |
| 1,605,235 A | * | 11/1926 | Huetter | 425/51 |
| 1,657,835 A | | 1/1928 | Mather | |
| 2,317,676 A | | 4/1943 | Dorsey | |
| 3,645,655 A | * | 2/1972 | Beneze | 425/49 |
| 6,332,999 B1 | * | 12/2001 | Caretta | 264/326 |
| 6,479,008 B1 | * | 11/2002 | Caretta | 264/326 |

(Continued)

FOREIGN PATENT DOCUMENTS

| | | | |
|---|---|---|---|
| EP | 0 715 947 A2 | 6/1996 | |
| EP | 715947 | * | 6/1996 |

(Continued)

OTHER PUBLICATIONS

Office Action mailed Jun. 10, 2010, from the European Patent Office for European Patent Application No. 05 849 541.7 (5 pages).
International Preliminary Report on Patentability for International Application No. PCT/IT2005/000743 dated Jun. 24, 2008 (8 pages).

*Primary Examiner* — James Mackey
(74) *Attorney, Agent, or Firm* — Finnegan, Henderson, Farabow, Garrett & Dunner, L.L.P.

(57) ABSTRACT

A green pneumatic tyre is built on a rigid toroidal support externally having a forming surface of a conformation corresponding to the inner shape of a tyre. The green tyre engaged on the expandable toroidal support is introduced into a vulcanisation mould and submitted to a vulcanisation cycle. During vulcanisation, axial moving apart of side portions of the toroidal support is caused so as to press the beads and sidewalls of the tyre against the vulcanisation mould.

35 Claims, 5 Drawing Sheets

(56) References Cited

U.S. PATENT DOCUMENTS

| | | |
|---|---|---|
| 6,757,955 B2 | 7/2004 | Scarzello et al. |
| 7,261,530 B2 * | 8/2007 | Mancosu et al. ............ 425/51 |
| 7,597,837 B2 * | 10/2009 | Caretta ..................... 264/326 |
| 7,648,668 B2 * | 1/2010 | Kata ......................... 264/326 |
| 8,172,973 B2 * | 5/2012 | Cantu' et al. ............ 156/130.5 |
| 2005/0226951 A1 | 10/2005 | Kata |

FOREIGN PATENT DOCUMENTS

| | | |
|---|---|---|
| EP | 1 506 852 A1 | 2/2005 |
| WO | WO-01/00395 A1 | 1/2001 |
| WO | WO-2004/045837 A1 | 6/2004 |

\* cited by examiner

METHOD AND APPARATUS FOR MANUFACTURING PNEUMATIC TYRES

CROSS REFERENCE TO RELATED APPLICATION

This application is a national phase application based on PCT/IT2005/000743, filed Dec. 19, 2005, the content of which is incorporated herein by reference.

BACKGROUND OF THE INVENTION

1. Field of the Invention

The present invention relates to a method and an apparatus for manufacturing pneumatic tyres.

2. Description of the Related Art

A pneumatic tyre for vehicle wheels generally comprises a carcass structure including at least one carcass ply having respectively opposite end flaps in engagement with respective annular anchoring structures, integrated into the regions usually identified as "beads".

Associated with the carcass structure is a belt structure comprising one or more belt layers, disposed in radial superposed relationship with respect to each other and to the carcass ply and having textile or metallic reinforcing cords with a crossed orientation and/or substantially parallel to the circumferential extension direction of the tyre. Applied to the belt structure at a radially external position is a tread band also made of elastomeric material like other semifinished products constituting the tyre.

It is to be pointed out, to the aims of the present description, that by the term "elastomeric material" it is intended a composition comprising at least one elastomer polymer and at least one reinforcing filler. Preferably, this composition further comprises additives such as cross-linking agents and/or plasticizers, for example. Due to the presence of the cross-linking agents, this material can be cross-linked through heating so as to form the final manufactured article.

Respective sidewalls of elastomeric material are also applied to the side surfaces of the carcass structure, each extending from one of the side edges of the tread band until close to the respective annular anchoring structure to the beads. In tyres of the tubeless type, an airtight coating layer, usually called "liner" covers the inner surfaces of the tyre.

Generally, in the manufacture of tyres for vehicle wheels it is provided that subsequently to building of the green tyre through assembly of the respective components, a moulding and curing treatment be carried out which aims at determining the structural stabilisation of the tyre through cross-linking of the elastomeric compositions and also at forming a desired tread pattern thereon, as well as possible graphic distinctive marks at the tyre sidewalls.

Manufacturing processes of recent conception are known in which building of the green tyre is carried out by making the different components thereof on a forming surface externally shaped as a toroidal support, the conformation of which is coincident with the inner conformation of the finished tyre. For carrying out the moulding and curing treatment, the green tyre is enclosed in the moulding cavity of a vulcanisation mould of a shape matching the outer conformation to be given to the finished tyre, together with the toroidal support on which the tyre itself has been built.

WO 01/00395, in the name of the same Applicant, depicts a method of the above mentioned type involving use of a toroidal support the forming surface of which has a substantially U-shaped outline in a diametral section plane of the toroidal support.

During closure of the vulcanisation mould, circumferential seats defined in the mould itself interfere against the radially internal edges of the shaped wall causing such an elastic deformation of the toroidal support that a high contact pressure is ensured between the circumferential seats of the mould and the radially internal edges of the shaped wall.

The toroidal support has an outer diameter slightly smaller than the inner diameter of the finished tyre. The tyre crown region is moulded against the inner surface of the moulding cavity following a radial expansion induced by steam under pressure introduced into a diffusion interspace defined between the toroidal support and the inner surface of the tyre itself.

WO-2004/045837 in the name of the same Applicant as well, proposes that preliminary heat be supplied to the tyre through feeding of a fluid in counter-pressure into the mould externally of the tyre, to counteract the pressure of steam or other fluid fed to the inside of the toroidal support. Thus heat can be supplied to a temperature high enough and for a time sufficiently long to ensure a correct consolidation of the beads an a sufficient cross-linking of the liner before carrying out moulding of the tyre crown portion through feeding of high-pressure steam into the diffusion interspace.

On practically carrying out said processes the Applicant could note different difficulties correlated with the tyre moulding and curing treatment.

In a moulding and vulcanisation process for tyres as the one disclosed in WO-01/00395, and/or in WO-2004/045837 an "imposed-volume" moulding is required on wide tyre regions extending, by way of indication, from the beads along the sidewalls and to the shoulders.

SUMMARY OF THE INVENTION

By observing that in the imposed-volume moulding the different tyre parts must have a geometry substantially identical with that of the spaces that when the mould is closed are confined between the toroidal support and the inner surfaces of the moulding cavity, the Applicant could deduce that in such a process precise working tolerances are required in forming the individual components during building of the tyre itself.

The Applicant has found the possibility of improving the quality of the finished product while at the same time achieving an important simplification in setting up the production processes, by building the tyre on a substantially rigid toroidal support to be introduced into the mould together with the tyre for carrying out the moulding and vulcanisation process and by imposing to the toroidal support, a movement in an axial direction of at least one portion thereof during said moulding and vulcanisation step.

More particularly, in a first aspect, the present invention relates to a method of manufacturing pneumatic tyres, each tyre comprising a crown region extending between side regions axially spaced apart from each other and each carrying a respective bead at a radially internal position, said method comprising the steps of:

building a green tyre on a toroidal support with an outer forming surface of a conformation corresponding to the inner shape of the built tyre, and having axially opposite side portions;

curing said tyre by the steps of:

introducing the green tyre disposed on said toroidal support into the vulcanisation mould;

closing the vulcanisation mould to compress the tyre side regions between said forming surface and the vulcanisation mould;

axially moving the side portions of the toroidal support away from each other at the tyre side regions to cause an additional pressing of said side regions against the vulcanisation mould;

supplying heat to the tyre enclosed in the vulcanisation mould.

Closure of the mould thus gives rise to compression of the tyre between the toroidal support and the inner surfaces of the moulding cavity, so that the sidewall and bead regions are shaped according to a moulding of the imposed-volume type, while the moving-apart movement of the side portions of the toroidal support in an axial direction produces an additional pressing of the tyre side regions and shaping of the same against the moulding cavity following an imposed-pressure moulding technique so as to eliminate possible localised faults due to lack of material for example.

In addition, carrying out pressing by axially moving the side portions of the toroidal support away from each other enables less narrow tolerances to be adopted in making the tyre components during building of same. The toroidal support in fact lends itself to conform to the tyre shape, compensating for possible geometric and dimensional faults close to the sidewalls, without falling into problems typically correlated with an imposed-volume moulding, findable in the moulding and curing treatment carried out with use of a rigid toroidal support in accordance with the known art.

The imposed pressure resulting from axial moving apart of the side portions of the toroidal support further gives rise to an improved anchoring action of the tyre beads, which is particularly advantageous where a radial expansion is wished to be imposed to the crown region of the tyre during the moulding and vulcanisation step.

In a further aspect, the invention relates to an apparatus for manufacturing pneumatic tyres, each tyre comprising a crown region extending between side regions axially spaced apart from each other and each carrying a respective bead at a radially internal position, said apparatus comprising:

at least one toroidal support with an outer forming surface of a conformation corresponding to the inner shape of a built tyre and having axially opposite side portions;

devices for building said green tyre on the toroidal support;

at least one vulcanisation mould set to engage the green tyre disposed on the toroidal support;

devices for curing the tyre enclosed in the vulcanisation mould;

devices for axially moving apart said side portions of the toroidal support at the side regions of the tyre enclosed in the vulcanisation mould.

In a third aspect, the invention relates to a toroidal support for building pneumatic tyres, each tyre comprising a crown region extending between side regions axially spaced apart from each other and each carrying a respective bead at a radially internal position, said toroidal support comprising:

an outer forming surface of a conformation corresponding to the inner shape of a built tyre and having axially opposite side portions;

devices for axially moving apart said side portions at the side regions of said built tyre.

BRIEF DESCRIPTION OF THE DRAWINGS

Further features and advantages will become more apparent from the description of a preferred, but not exclusive, embodiment of a method and an apparatus for manufacturing tyres, in accordance with the present invention. This description will be set out hereinafter with reference to the accompanying drawings, given by way of non-limiting example, in which.

DETAILED DESCRIPTION OF THE INVENTION

Figure 1:
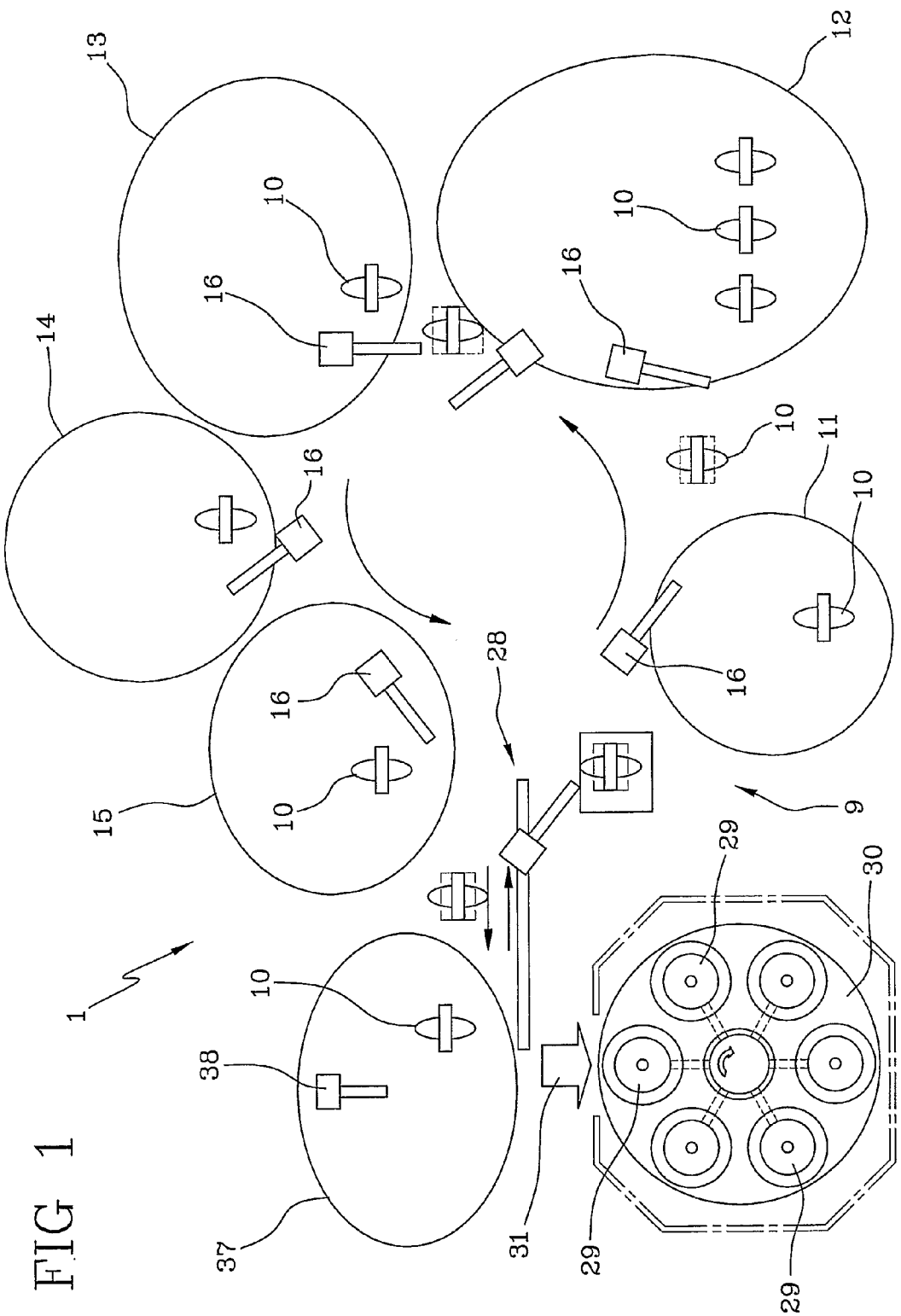
FIG. 1 is a diagrammatic top view of an apparatus for manufacturing tyres in accordance with the present invention.
Figure 2:
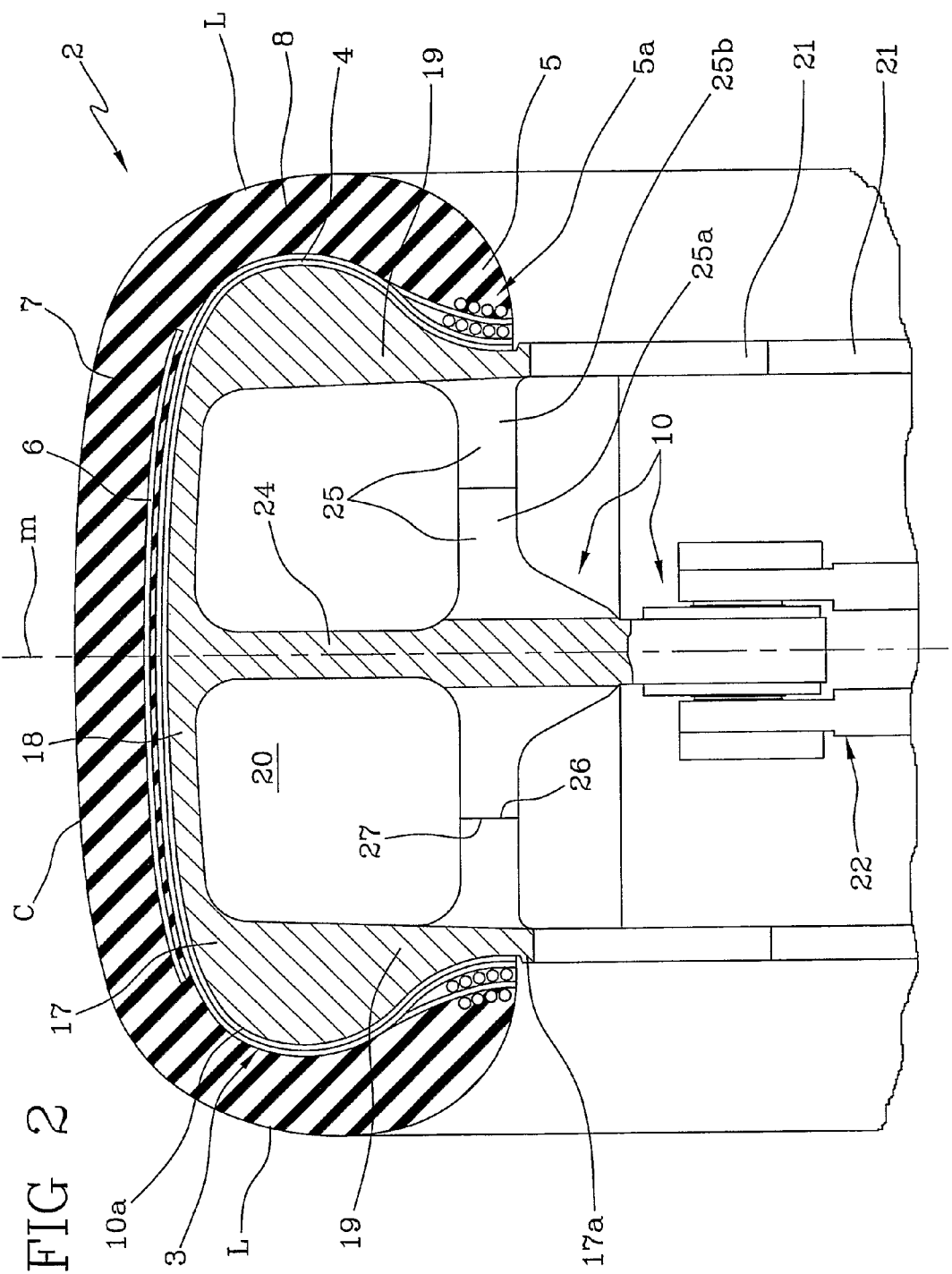
FIG. 2 is a diametrical section view of a tyre disposed on a rigid toroidal support, at the end of the tyre building cycle.

With reference to the drawings, an apparatus for manufacturing tyres in accordance with the present invention has been generally identified by reference numeral 1.

Apparatus 1 is set to manufacture tyres 2 essentially comprising at least one carcass ply 3 preferably internally coated with a layer of an airtight elastomeric material or a so-called liner 4, two annular anchoring structures 5a in engagement with circumferential edges of the carcass ply 3 close to the regions usually identified as "beads" 5, a belt structure 6 circumferentially applied to the carcass ply 3, a tread band 7 circumferentially superposed on the belt structure 6, in a so-called crown region "C" of tyre 2, and two sidewalls 8 applied to the carcass ply 3 at laterally opposite positions, each at a side region "L" of tyre 2 and extending from the corresponding bead 5 to the corresponding side edge of the tread band 7.

Apparatus 1 essentially comprises devices for building tyres 2 including a plurality of building stations 11, 12, 13, 14, 15 for example, that are distributed along a building line 9 and are each set to make one component of the tyre 2 being processed directly on a toroidal support 10 having a forming surface 10a of a conformation corresponding to the inner shape of tyre 2 when building has been completed.

In more detail, by way of example, a first building station 11 may be provided in which liner 4 is formed through winding of a continuous elongated element of elastomeric material into coils disposed close to each other and distributed along the forming surface 10a of the toroidal support 10. In at least one second building station 12 one or more carcass plies 3 can be formed and they are obtained through laying of strip-like elements disposed in a circumferentially approached arrangement on the toroidal support 10, said strip-like elements being cut off from a continuous strip of elastomeric material comprising textile or metallic cords arranged in parallel side by side relationship. A third building station 13 can be dedicated to manufacture of the annular anchoring structures 5a integrated into the tyre beads 5 through laying of at least one continuous elongated element comprising at least one rubberised metal cord, in the form of radially superposed coils. At least one fourth building station 14 may be dedicated to manufacture of the annular belt structure 6 obtained by laying in a circumferentially-approached relationship, strip-like elements cut off from a continuous strip of elastomeric material comprising mutually parallel preferably metallic cords, and/or through winding of at least one preferably metallic rubberised reinforcing cord into coils disposed in axial side by side relationship, at the crown portion of tyre 2. At least one fifth building station 15 can be set for manufacture of the tread band 7 and the sidewalls 8. Tread band 7 and sidewalls 8 are preferably obtained through winding of at least one continuous elongated element of elastomeric material into coils disposed in mutual side by side relationship.

The building stations 11, 12, 13, 14, 15 distributed along the building line 9 can each simultaneously operate on a respective tyre 2 being processed, carried by a respective rigid toroidal support 10, sequentially transferred from a building station to the next one, through robotized arms 16 or other suitable devices.

Advantageously, the forming surface 10a of each toroidal support 10 is obtained on a shaped wall 17 preferably made of metal material, an aluminium alloy for example, or other material having a modulus of elasticity high enough to bear stresses transmitted to the toroidal support 10 during manufacture of tyre 2 without suffering permanent sets.

The shaped wall 17 has a radially external portion 18 placed close to the crown portion of tyre 2, and two axially opposite side portions 19 extending from the radially external portion 18 and defining respective radially internal circumferential edges 17a of the shaped wall 17.

As viewed from the accompanying drawings, the radially external portion 18 and side portions 19 give the shaped wall 17, in a diametral section plane of the toroidal support 10, a substantially U-shaped outline delimiting at least one circumferential cavity 20 in the toroidal support itself.

To enable subsequent disengagement of the toroidal support 10 from tyre 2, said toroidal support has a collapsible or dismountable structure made up of a plurality of circumferential sectors 21 disposed in mutual circumferential alignment relationship. The circumferential sectors 21 are mutually interconnected by a removable interconnecting flange 22 carrying at least one grip shank 23 to be utilised to enable handling of the toroidal support 10 between the different building stations 11, 12, 13, 14, 15. The interconnecting flange 22 engages each circumferential sector 21 at an attachment plate 24 extending from the radially external portion 18 of the shaped wall 17, preferably in a radial middle plane "m" of the toroidal support 10.

Axially extending between the side portions 19 of the shaped wall 17, preferably in the vicinity of the radially internal circumferential edges 17a of said wall are stop struts 25 each carrying an abutment surface 26 axially opposite to a respective locating seat 27. The abutment surfaces 26 and locating seats 27 are adapted to act against each other to stop axial approaching movements between the side portions 19, in order to efficiently hinder undesirable axial contractions of the toroidal support 10 so as to maintain the structural integrity of the shaped wall 17 even under the effect of important axial thrusts transmitted to said side portions 19.

In more detail, in the embodiment shown, at least one pair of stop struts 25 is provided for each circumferential sector 21 of the toroidal support 10; they are axially in alignment with each other and each extend from the corresponding side portion 19 of the shaped wall 17 until the attachment plate 24. In addition, each stop strut 25 is divided into an axially internal portion 25a integral with the attachment plate 24 and carrying the locating seat 27, and an axially external portion 25b integral with the side portion 19 of the shaped wall 17 and carrying the abutment surface 26.

In the absence of stresses on the toroidal support 10, the abutment surfaces 26 and locating seats 27 can already be in mutual-contact relationship or at all events disposed to such a distance that axial approaching of the side portions 19 is stopped upon reaching of a maximum axial contraction stroke included, by way of indication, between about 0.01 mm and about 0.15 mm, preferably shorter than about 0.1 mm.

To this aim, in the embodiment shown, the distance "n" between each abutment surface 26 and the respective locating seat 27 in a rest condition to which corresponds the absence of stresses on the toroidal support 10, must be included between about 0.01 mm and about 0.15 mm, preferably shorter than 0.1 mm.

When building has been completed, the tyre 2 and toroidal support 10 reach a transfer station 28 for introduction into a vulcanisation mould 29. In the example shown in FIG. 1 a plurality of vulcanisation moulds 29 is provided which are disposed in a rotatable structure 30 so as to be sequentially brought to a loading/unloading position 31 where removal of the cured tyre 2 is carried out, followed by introduction of a green tyre 2 coming from the building line 9.

Each vulcanisation mould 29 essentially has a pair of axially opposite plates 32 mutually movable in an axial direction to abut against the side regions of tyre 2, and a plurality of moulding sectors 33 circumferentially distributed between the plates 32 and mutually movable in an axial direction to act on the crown region C of tyre 2.

Figure 3:
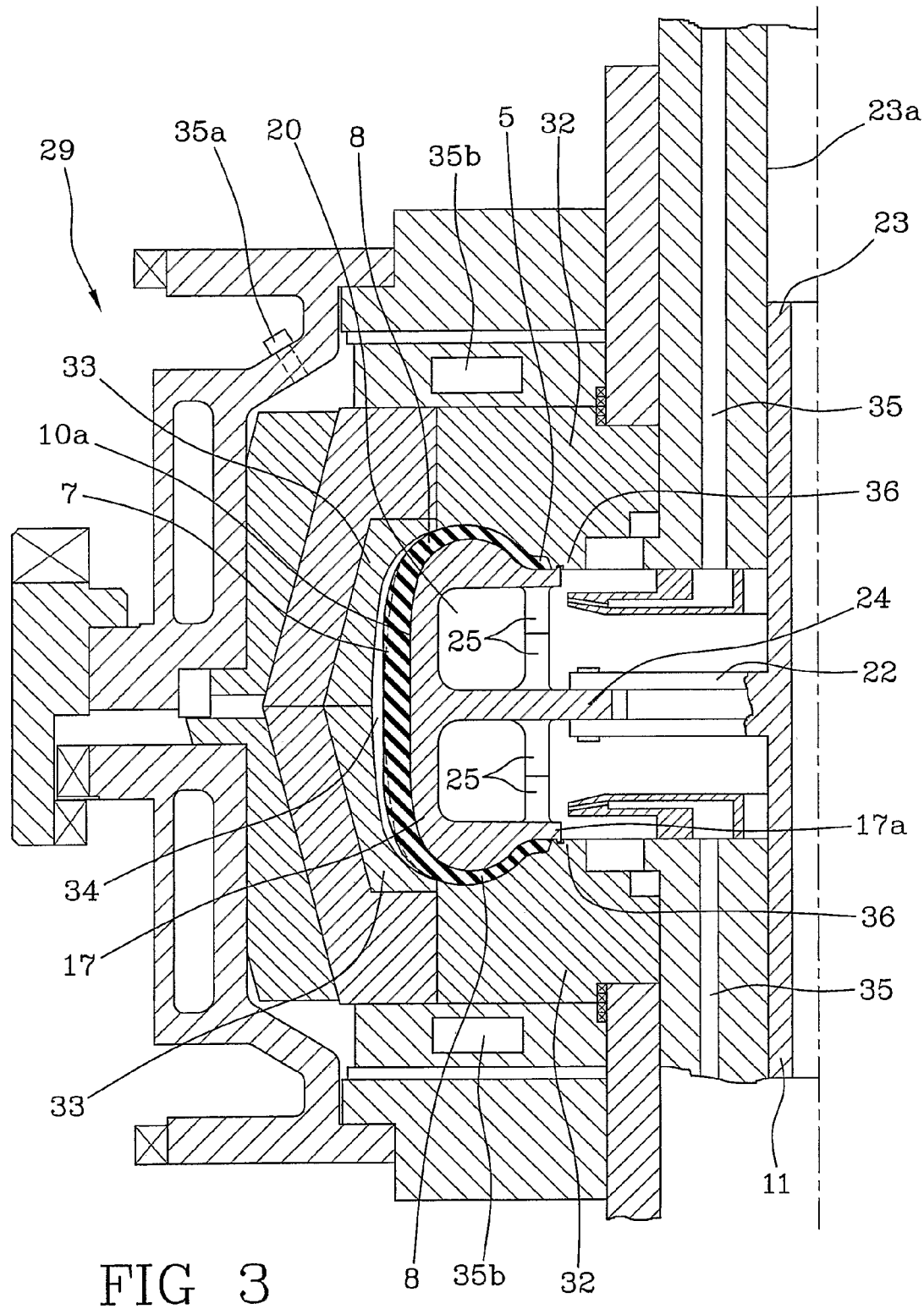
FIG. 3 is a fragmentary diametrical section view of the tyre enclosed in a vulcanisation mould together with the toroidal support, during a first stage of the moulding and curing treatment.
Figure 4:
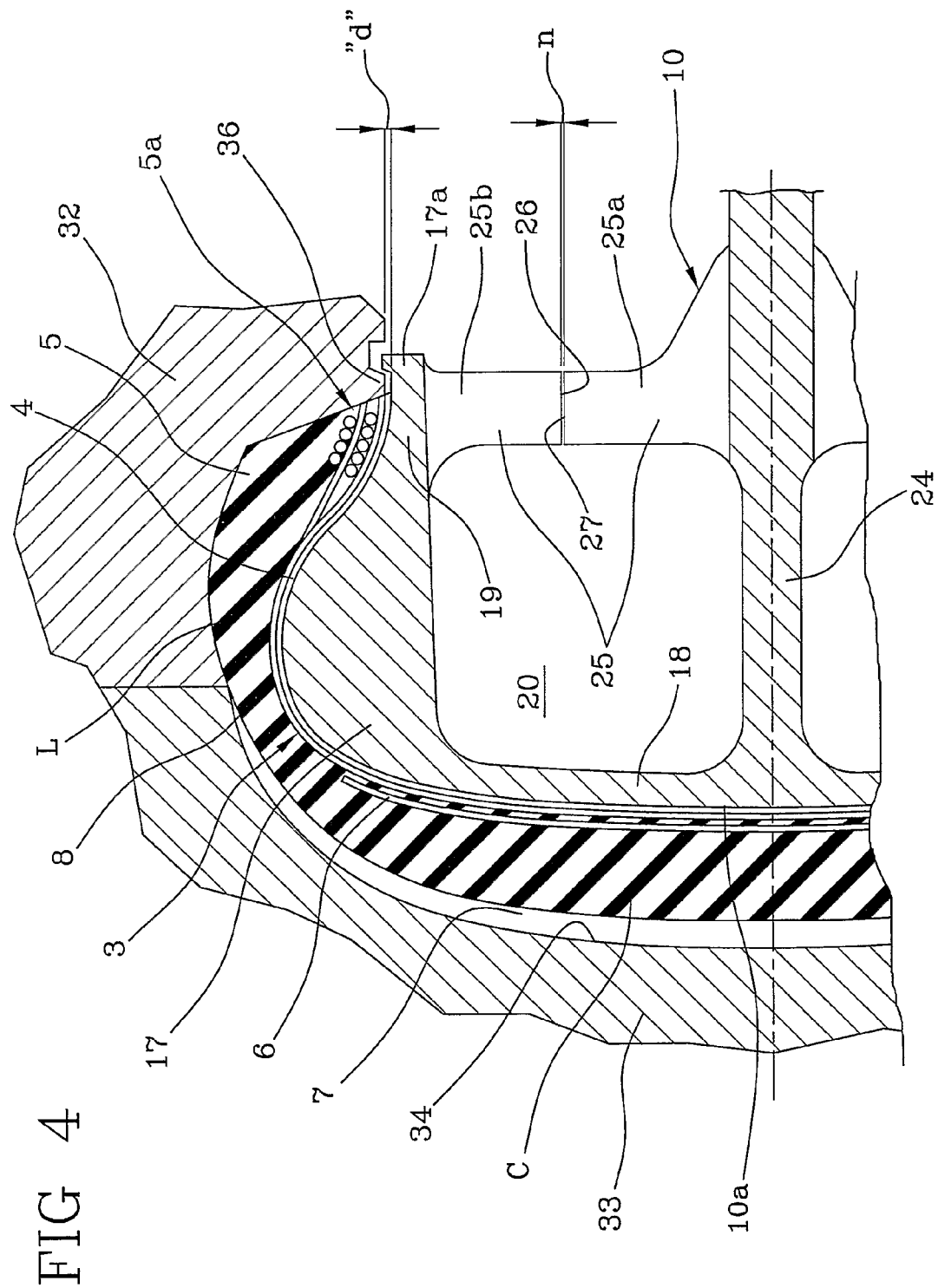
FIG. 4 shows a detail of FIG. 3 to an enlarged scale.
Figure 5:
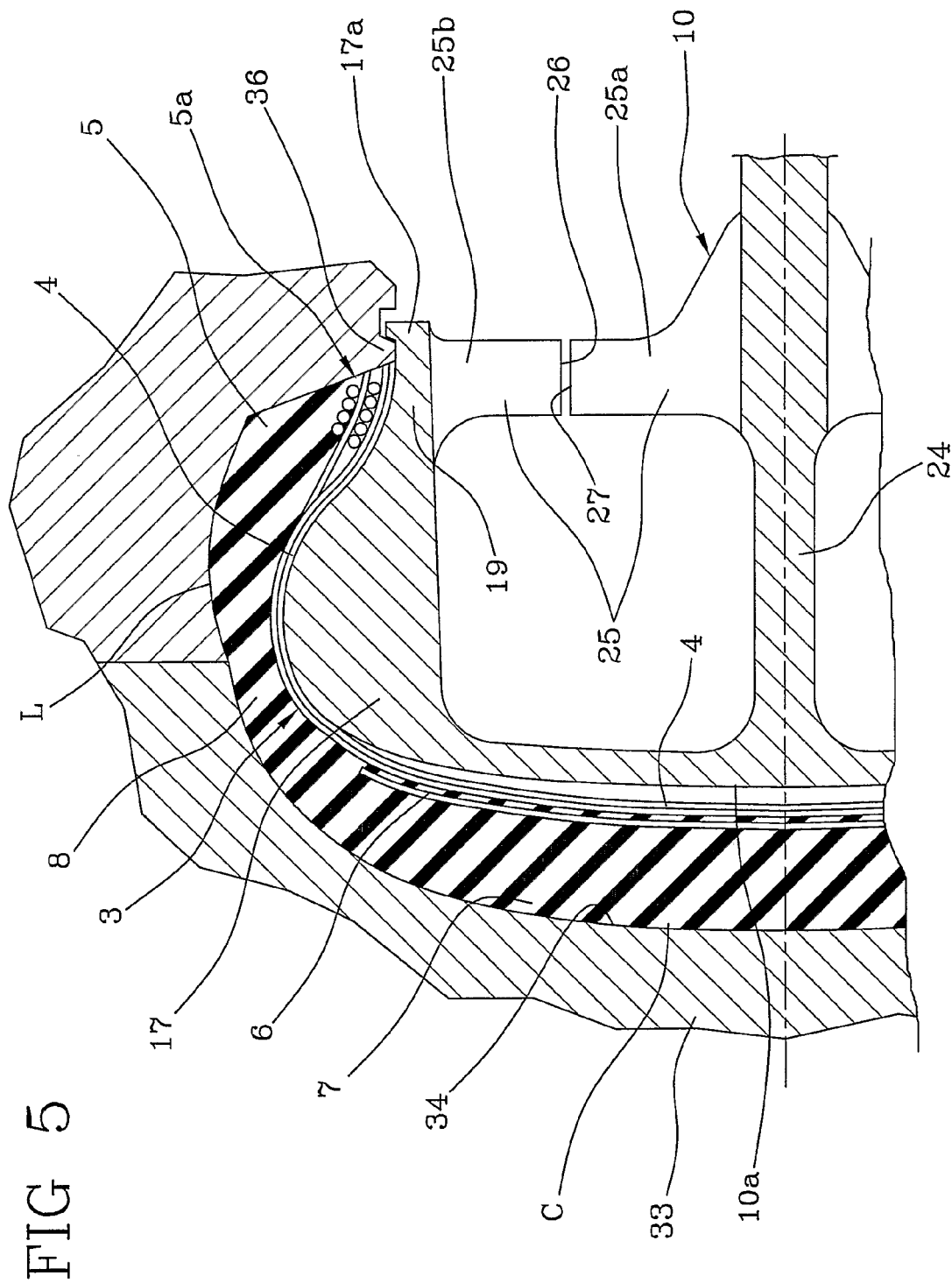
FIG. 5 shows the detail in FIG. 4 during a second stage of the tyre moulding and curing treatment.

In more detail, the vulcanisation mould 29 can be changed over between an open condition at which the plates 32 and moulding sectors 33 are mutually spaced apart to enable introduction and removal of tyre 2 together with the toroidal support 10, and a closed condition at which, as shown in FIGS. 3 to 5, the plates and moulding sectors are disposed close to each other to define a moulding cavity 34 having a conformation corresponding to the outer shape to be given to the cured tyre 2.

Preferably, the moulding cavity 34 has diametrical sizes slightly larger than the diametrical sizes of the green tyre 2, so that the inner surface in the moulding cavity 34 is suitably spaced apart from the tread band of the green tyre 2 enclosed in the vulcanisation mould 29.

During introduction of tyre 2 into the vulcanisation mould 29, the grip shank 23 carried by the toroidal support 10 is adapted to be inserted in at least one centring seat 23a formed in the vulcanisation mould 29, to ensure a centred positioning of tyre 2.

Then a vulcanisation cycle of tyre 2 is initiated. To this aim, the vulcanisation mould 29 is closed through axial approaching of the axially opposite plates 32 and simultaneous radial approaching of the moulding sectors 33.

Under this circumstance, the side portions 19 of the shaped wall 17 lend themselves to efficiently act against the side regions of tyre 2, to counteract the axial thrust exerted by plates 32 during the end step for closure of the vulcanisation mould 29. The side regions of tyre 2, and in particular the beads 5 and the radially inner part of the sidewalls 8 are therefore compressed between the plates 32 of the vulcanisation mould 29 and the side portions 19 of the shaped wall 17 and consequently submitted to an efficient moulding action substantially of the imposed-volume type.

In this way all or most of the surface unevennesses given to the beads 5 and sidewalls 8 during building, for example due to the above described laying of continuous elongated elements of elastomer material in the form of coils disposed close to each other, are eliminated.

The presence of the stop struts 25 between the side portions 19 of the shaped wall 17 eliminates or in any case stops axial approaching of the side portions 19 to a predetermined extent, by effect of the imposed axial thrusts upon closure of the vulcanisation mould 29. It is therefore possible to move the plates 32 quickly close to each other thereby achieving an important reduction in the time that would be required for closing the vulcanisation mould 29 if, due to the absence of the stop struts 25, particular care should be taken not to overstress the toroidal support 10.

When closure of the vulcanisation mould 29 has been completed, heat supply to tyre 2 is carried out by vulcanisation devices, with the aid of at least one vulcanisation fluid fed to the inside of the circumferential cavity 20 of the toroidal support 10, through at least one feeding circuit 35 opening into the vulcanisation mould 29.

Preferably, control devices not described or shown because they can be made in any convenient manner, operate on the feeding circuit 35 to govern feeding of the vulcanisation fluid and consequently heat supply during two stages in succession.

A first heat-supply stage aims at obtaining a localised cross-linking at the inner surface of the tyre 2, to enable liner 4 to acquire sufficient imperviousness for execution of a subsequent second heat-supply stage aiming at causing full vulcanisation of tyre 2.

In addition to the localised cross-linking of liner 4 or as an alternative thereto, the first heat-supply stage also causes a localised cross-linking aiming at achieving a structural consolidation of the side regions of tyre 2, particularly at the beads and the radially internal portions of the sidewalls 8.

In more detail, the first heat-supply stage, of a duration included by way of indication between about 2 and about 6 minutes, preferably equal to about 3 minutes, preferably involves supply of vulcanisation fluid, steam and/or nitrogen for example, under such temperature and pressure conditions that a suitable heat transmission to liner 4 and/or the side regions of tyre 2 is allowed, without causing the side portions 19 of the shaped wall 17 to open wide to an important degree.

To this aim, the vulcanisation devices can further comprise an auxiliary feeding circuit 35a that, concurrently with feeding of the vulcanisation fluid to the inside of the circumferential cavity 20 of the toroidal support 10, introduces an auxiliary counter-pressure fluid, nitrogen for example, into the moulding cavity 34, externally of tyre 2, said fluid preferably being to a temperature lower than 50° C. and preferably a pressure at least as high as the feeding pressure of the vulcanisation fluid.

In more detail, the feeding pressure of the counter-pressure fluid is preferably adapted to generate a first pressure gradient included by way of indication between about 1 bar and about 3 bars, between the exterior of tyre 2 and the circumferential cavity 20 defined within the toroidal support 10.

Just as an indication, the feeding pressure of the vulcanisation fluid during the first stage can be less than 16 bars, equal to about 14 bars for example, while the counter-pressure fluid is admitted to a pressure included between about 7 bars and about 17 bars, equal to about 16 bars for example.

Thus a "negative" pressure gradient is generated, i.e. a pressure in the circumferential cavity 20 that is lower than the pressure present in the moulding cavity 34, externally of tyre 2, by about 2 bars and is capable of advantageously causing pressing of the inner surface of tyre 2 against the forming surface 10a of the toroidal support 10, in the same manner as described in document WO-2004/045837, in the name of the same Applicant.

At the same time, due to heat transmitted through the side portions 10 of the shaped wall 17 by effect of the vulcanisation fluid admitted to the toroidal support 10, and through the mould plates 32 upon effect of further heating devices associated with said plates 32, a localised cross-linking of the liner and/or the side regions of tyre 2 is produced, particularly at the beads 5 and the radially internal parts of the sidewalls 8, without giving rise to an important cross-linking of the radially external parts of tyre 2 extending, just as an indication, on the tread band 7 and the radially external portions 18 of the sidewalls 8.

Then the second heat-supply stage is initiated during which tyre 2 receives the required heat for full cross-linking, i.e. a cross-linking sufficient to ensure the geometric and structural stability of the tyre itself in accordance with the design specifications.

Upon command of said control devices, the second heat-supply stage is carried out by evacuating the counter-pressure fluid, if any, previously introduced into the vulcanisation mould 29 and admitting vulcanisation fluid, steam and/or nitrogen for example, into the circumferential cavity 20 of the toroidal support 10 to a second pressure value included, by way of indication, between 20 bars and 30 bars, equal to about 27 bars for example, so as to generate a second "positive" pressure gradient between the circumferential cavity 20 and the moulding cavity 34, i.e. a pressure in the circumferential cavity 20 that is about 27 bars higher than the pressure present in the moulding cavity 34, externally of tyre 2 and is capable of advantageously determining pressing of the outer surface of tyre 2 against the inner surface of the moulding cavity 34.

The high pressure created inside the toroidal support 10 causes inflow of the vulcanisation fluid between the forming surface 10a and the inner surface of tyre 2 in the crown region C, through radial apertures (not shown) defined between the opposite edges of circumferentially adjoining sectors 21 of the toroidal support itself, for example. The crown region C of tyre 2 is thus pressed against the inner surface of the moulding cavity 34 and submitted to moulding of the "imposed-pressure" type.

In accordance with the present invention, also provided are devices that, after tyre 2 has been shut in the vulcanisation mould 29 and preferably concurrently with execution of the second heat-supply stage, cause axial moving apart of the side portions 19 of the shaped wall 17 of the toroidal support 10. i.e. at the side regions L of tyre 2.

To this aim it is advantageously provided that closure of the vulcanisation mould 29 be completed in the absence of direct contact between the plates 32 of the vulcanisation mould 29 and the shaped wall 17 of the toroidal support 10, to give the side portions 19 of the shaped wall 17 the possibility of slightly opening wide, starting from a rest condition corresponding to the absence of stresses on the toroidal support.

Preferably, said devices for axially moving apart said side portions 19 can be partly represented by interruptions determined by the presence of said abutment surfaces 26 and locating seats 27 along the stop struts 25. In fact, these interruptions give the side portions 19 of the shaped wall 17 freedom of axially moving mutually apart.

Due to mobility of the side portions 19 of the shaped wall 17, an additional pressing of the beads 5 and the radially internal parts of the sidewalls 8 can be carried out, which is capable of eliminating any possibly residual surface unevenness therefrom.

Said additional pressing further allows the components of tyre 2 at the beads 5 to be retained more efficiently, by counteracting stresses induced by the radial expansion imposed to tyre 2.

Axial moving apart of the side portions 19 of the toroidal support 10 is stopped, in case of need, on achievement of a position of maximum spreading apart of the side portions 19. Thus too many stresses on the toroidal support 10 are avoided which could cause permanent sets of the shaped wall 17 and/or an excessive compression and deformation of the beads 5 and the radially internal parts of the sidewalls 8.

To this aim, circumferentially formed on each of the plates 32 is at least one stop seat 36 arranged to act in contact with the corresponding side portion 19 of the toroidal support 10, in the vicinity of the radially internal circumferential edge 17a of the shaped wall 17, internally projecting with respect to the tyre bead.

At the end of the step of closing the vulcanisation mould 29, the circumferential stop seats 36 reach a position to a predetermined distance "d", included by way of indication between about 0.1 and about 0.5 mm, from the side portions 19 of the shaped wall 17.

Consequently, each of the side portions 19, when closure is over, is movable upon elastic deformation of the shaped wall 17 to the position of maximum spreading apart, according to a stroke substantially equal to the distance "d" measurable at the tyre bead.

At the end of vulcanisation, the vulcanisation mould 29 is brought back to the open condition to enable extraction of the cured tyre 2 together with the toroidal support 10.

Subsequently, in a disassembling station 37 removal of the toroidal support 10 from tyre 2 is carried out by means of an auxiliary robotized arm 38 for example, preferably by centripetal extraction of the individual circumferential sectors 21 after dismantling the interconnecting flange 22, as described in U.S. Pat. No. 6,757,955 in the name of the same Applicant, for example.

The invention claimed is:

1. A method of manufacturing pneumatic tyres, each tyre comprising a crown region extending between side regions axially spaced apart from each other and each carrying a respective bead at a radially internal position, the method comprising the steps of:
   building a green pneumatic tyre on a toroidal support having an outer forming surface of a conformation corresponding to the inner shape of the built tyre and provided with axially opposite side portions; and
   curing said tyre by the steps of:
      introducing the green tyre disposed on said toroidal support into a vulcanisation mould;
      closing the vulcanisation mould to compress the tyre side regions between said forming surface and the vulcanisation mould while forming a space between at least a portion of the vulcanisation mould and the crown region of the tyre;
      axially moving the side portions of the toroidal support apart from each other at the tyre side regions to cause an additional pressing of said side regions against the vulcanisation mould; and
      supplying heat to the tyre enclosed in the vulcanisation mould.

2. The method as claimed in claim 1, wherein building of the green tyre comprises application of components of said tyre against the forming surface of the toroidal support.

3. The method as claimed in claim 1, wherein the toroidal support is made up of circumferential sectors that are removably in engagement, in circumferential mutual alignment relationship.

4. The method as claimed in claim 1, wherein the forming surface is obtained on a shaped wall confining at least one circumferential cavity in the toroidal support, said step of axially moving apart said side portions comprising admission of a working fluid under pressure into said circumferential cavity.

5. The method as claimed in claim 4, wherein said shaped wall substantially extends along a U-shaped outline in a diametral section plane of the toroidal support.

6. The method as claimed in claim 1, wherein axial moving apart of the side portions takes place according to a stroke between about 0.1mm and about 0.5 mm, measurable at each bead of the tyre.

7. The method as claimed in claim 1, further comprising the step of stopping axial approaching movements between said side portions during compression of the side regions of the tyre between the forming surface and the vulcanisation mould.

8. The method as claimed in claim 7, wherein said stopping step takes place after axial approaching of the side portions by about 0.01 mm to about 0.15 mm, 9. The method as claimed in claim 7, wherein said stopping step takes place after axial approaching of the side portions by less than about 0.1 mm.

10. The method as claimed in claim 1, wherein the step of supplying heat to the tyre comprises:
    supplying heat by a first heat-supply stage carried out before axially expanding the toroidal support to cause a localised cross-linking at the radially internal surface and/or side regions of the tyre.

11. The method as claimed in claim 10, wherein the step of supplying heat to the tyre comprises:
    supplying heat by a second heat-supply stage carried out concurrently with axial moving apart of the side portions of the toroidal support to fully cross-link the tyre.

12. The method as claimed in claim 11, wherein supplying heat by the first heat-supply stage is carried out through admission of a vulcanisation fluid to a first pressure value into the toroidal support.

13. The method as claimed in claim 12, wherein supplying heat by the second heat-supply stage is carried out through admission of a vulcanisation fluid to a second pressure value higher than the first pressure value, into the toroidal support.

14. The method as claimed in claim 13, wherein the first pressure value is between about 7 bars and about 17 bars.

15. The method as claimed in claim 10, wherein supplying heat by the first heat-supply stage has a duration in the range of 2 to 6minutes.

16. The method as claimed in claim 13, wherein the second pressure value is between about 20 bars and about 30 bars.

17. The method as claimed in claim 10, further comprising the step of:
    admitting a counter-pressure fluid into the vulcanisation mould concurrently with supplying heat by said first heat-supply stage, to generate a first pressure gradient so as to press the radially internal surface of the tyre against a radially external surface of the toroidal support.

18. The method as claimed in claim 17, comprising the step of:
    evacuating said counter-pressure fluid concurrently with supplying heat by a second heat-supply stage, to generate a second pressure gradient so as to press the radially external surface of the tyre against a radially internal surface of a moulding cavity.

19. The method as claimed in claim 1, wherein said building step takes place by forming at least one component of the tyre through winding of an elongated element of elastomeric material into coils disposed in mutual side by side relationship and distributed along the forming surface of the toroidal support.

20. The method as claimed in claim 1, wherein said building step takes place by forming at least one component of the tyre through laying of strip-like elements of elastomeric material comprising cords disposed circumferentially in parallel side by side relationship on said toroidal support.

21. The method as claimed in claim 1, wherein said building step takes place by forming at least one component of the tyre through laying of at least one continuous elongated element in radially superposed coils on said toroidal support, the at least one continuous elongated element comprising at least one rubberised metal cord.

22. The method as claimed in claim 1, wherein said building step takes place by forming at least one component of the tyre through winding of at least one reinforcing cord on said toroidal support in the form of coils disposed in axial side by side relationship at the crown region of the tyre.

23. A method of manufacturing pneumatic tyres, each tyre comprising a crown region extending between side regions axially spaced apart from each other and each carrying a respective bead at a radially internal position, the method comprising:
 budding a green pneumatic tyre on a toroidal support having an outer forming surface of a conformation corresponding to the inner shape of the built tyre and provided with axially opposite side portions; and
 curing said tyre by the steps of:
  introducing the green tyre disposed on said toroidal support into a vulcanisation mould;
  closing the vulcanisation mould to compress the tyre side regions between said forming surface and the vulcanisation mould;
  axially moving the side portions of the toroidal support apart from each other at the tyre side regions to cause an additional pressing of said side regions against the vulcanisation mould; and
  supplying heat to the tyre enclosed in the vulcanisation mould, wherein the step of supplying heat to the tyre comprises supplying heat by a first heat-supply stage carried out before axially expanding the toroidal support to cause a localised cross-linking at the radially internal surface and/or side regions of the tyre.

24. The method as claimed in claim 23, wherein the step of supplying heat to the tyre further comprises:
 supplying heat by a second heat-supply stage carried out concurrently with axial moving apart of the side portions of the toroidal support to fully cross-link the tyre.

25. The method as claimed in claim 24, wherein supplying heat by the first heat-supply stage is carried out through admission of a vulcanisation fluid to a first pressure value into the toroidal support.

26. The method as claimed in claim 25, wherein supplying heat by the second heat-supply stage is carried out through admission of a vulcanisation fluid to a second pressure value higher than the first pressure value, into the toroidal support.

27. The method as claimed in claim 26, wherein the first pressure value is between about 7 bars and about 17 bars.

28. The method as claimed in claim 23, wherein supplying heat by the first heat-supply stage has a duration in the range of 2 to 6 minutes.

29. The method as claimed in claim 26, wherein the second pressure value is between about 20 bars and about 30 bars.

30. The method as claimed in claim 23, further comprising the step of:
 admitting a counter-pressure fluid into the vulcanisation mould concurrently with supplying heat by said first heat-supply stage, to generate a first pressure gradient so as to press the radially internal surface of the tyre against a radially external surface of the toroidal support.

31. The method as claimed in claim 30, comprising the step of:
 evacuating said counter-pressure fluid concurrently with supplying heat by a second heat-supply stage, to generate a second pressure gradient so as to press the radially external surface of the tyre against a radially internal surface of a moulding cavity.

32. The method as claimed in claim 1, further comprising:
 admitting a counter-pressure fluid into the space between the portion of the vulcanisation mould and the crown region of the tyre concurrently with supplying heat to the tyre so as to press a radially internal surface of the tyre against a radially external surface of the toroidal support.

33. The method as claimed in claim 32, further comprising:
 evacuating the counter-pressure fluid concurrently with supplying heat to the tyre, to generate a second pressure gradient so as to press the crown region of the tyre against the portion of the vulcanisation mould.

34. The method as claimed in claim 33, wherein:
 the counter-pressure fluid is admitted concurrently with supplying heat to the tyre in a first heat-supply stage; and
 the counter-pressure fluid is evacuated concurrently with supplying heat to the tyre in a second heat-supply stage after the first heat-supply stage.

35. The method as claimed in claim 34, wherein the side portions of the toroidal support move axially concurrently with supplying heat to the tyre in the second heat-supply stage.

* * * * *